United States Patent [19]

Cunningham

[11] Patent Number: 4,458,280
[45] Date of Patent: Jul. 3, 1984

[54] SERVO WRITING TRANSDUCER DESIGN AND WRITING METHOD

[75] Inventor: Earl A. Cunningham, Rochester, Minn.

[73] Assignee: International Business Machines Corporation, Armonk, N.Y.

[21] Appl. No.: 339,940

[22] Filed: Jan. 18, 1982

[51] Int. Cl.³ ............................ G11B 5/12; G11B 5/22
[52] U.S. Cl. ..................................... 360/125; 360/122
[58] Field of Search ............................... 360/125–127, 360/122, 123, 119

[56] References Cited

U.S. PATENT DOCUMENTS

| | | | |
|---|---|---|---|
| 3,678,482 | 7/1972 | Billawala | 360/103 |
| 4,190,872 | 2/1980 | Jones, Jr. et al. | 360/125 |
| 4,193,103 | 3/1980 | Fesler et al. | 360/122 |
| 4,219,854 | 8/1980 | Church et al. | 360/123 |
| 4,219,855 | 8/1980 | Jones, Jr. | 360/125 |

*Primary Examiner*—John H. Wolff
*Attorney, Agent, or Firm*—Robert W. Lahtinen

[57] ABSTRACT

A servo writing transducer is shown having transverse side surfaces of the pole pieces adjoining the gap formed to optimize compression of the fringe field at one transverse side to reduce the dead band intermediate servo tracks. The existence of a wider fringe field region at the opposite transverse side is without consequence since the servo writing procedure is to first write the farthest track at the transducer side at which the compressed field occurs followed by each succeeding, adjoining servo track causing the information written in the wide fringe field to be overwritten by the next track.

6 Claims, 10 Drawing Figures

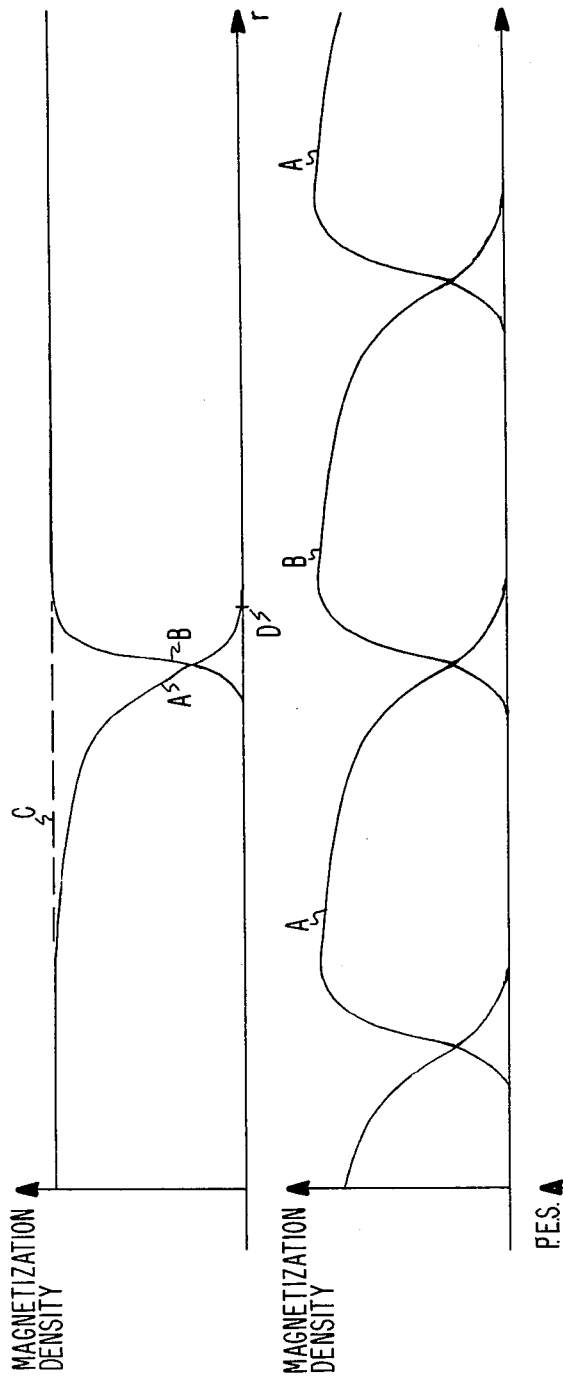

SERVO WRITING TRANSDUCER DESIGN AND WRITING METHOD

BACKGROUND OF THE INVENTION

This invention pertains to magnetic media storage devices where data and servo information are stored in adjoining tracks and more particularly to a structure and method for more effectively writing servo data on the media of such a device.

Servo tracks for magnetic media recording are normally offset a half-track pitch from the associated data tracks whereupon the servo reading is accomplished by sensing the signals from two adjoining servo tracks and establishing the proper data track location by adjusting the servo head position until the signals read from the two interfacing tracks are of equal magnitude indicative of positioning on the centerline of the associated data track or tracks. Data tracks are spaced from adjoining data tracks and only occupy about 80 percent of the track pitch; however, servo tracks are recorded with a width equal to the full track pitch or spacing between adjoining track centerlines. Consequently any condition that impairs the servo track width makes the system less accurate and less effective.

The phenomena that is the principal factor in impairing the adjoining track of a properly operating servo writing system is the fringe field which exists transversely beyond the recording head that confronts the media and is intended to define the width to which the magnetic signals are written. Thus, the head will write significantly wider than the physical core width. This writing beyond the core width erases previous data and replaces it with very low resolution signals. Subsequently, when a servo read head is attempting to seek the data track centerline, the servo track interface which should present signals of equal strength at either side presents a full strength signal at the edge of the servo track most recently written and a degraded signal along the confronting edge of the adjoining track previously written. As track densities increase, and track widths correspondingly decrease, the effect of this degraded region becomes a greater and greater percentage of the signal.

SUMMARY OF THE INVENTION

To minimize the fringe field problems associated with servo writing, the servo write head of the present invention has a configuration with a first transverse side of the head formed to minimize the writing of fringe fields while the second side, the transverse side opposite the first side, is configured to provide a low pole piece reluctance and reasonable write head efficiency. This permits compression of the field at the first transverse side. The fact that the structure of the second transverse side causes the writing of a wide fringe field is of no importance since servo writing using the head is accomplished by starting with the farthest servo track at the first side of the servo write head so that the narrow fringe field adjoins each previously written track, and the wide fringe field region adjacent the head second transverse side is overwritten by the next succeeding servo track.

BRIEF DESCRIPTION OF THE DRAWING

FIG. 5 which includes FIGS. 5A, 5B and 5C illustrates magnetization levels and position error signal values at a high track density associated with the typical 45° angle ferrite servo writing head of FIG. 4.

FIG. 6 including

DETAILED DESCRIPTION

Figure 2:
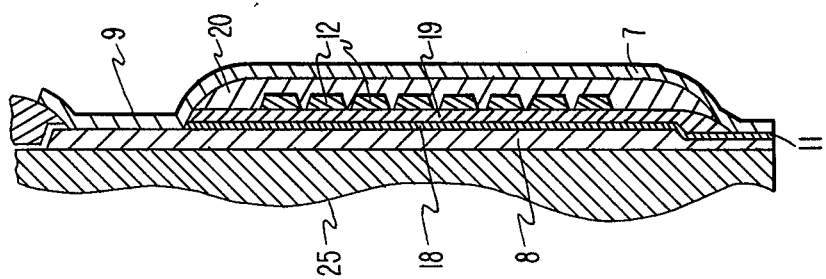
FIG. 2 is an enlarged partial section view of the thin film head of FIG. 1 taken along line 1—1.
Figure 1:
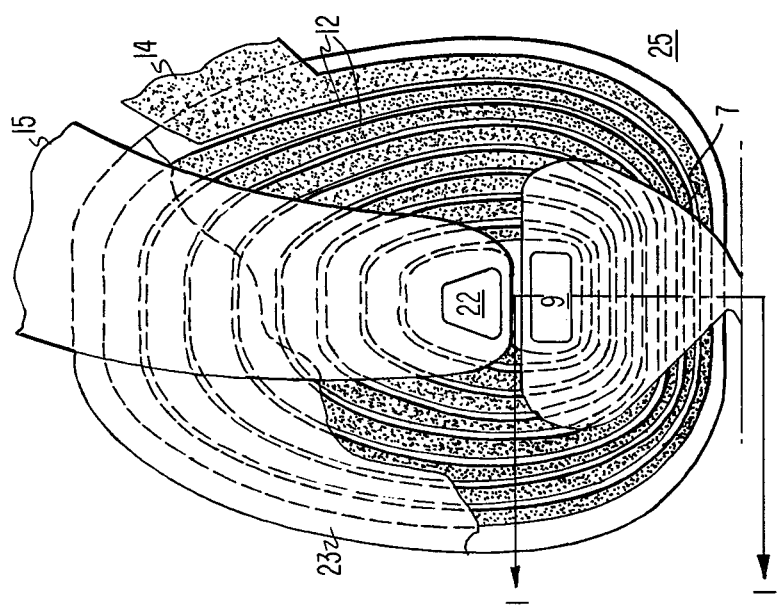
FIG. 1 shows a thin film head incorporating the present invention.

FIGS. 1 and 2 show a thin film magnetic head assembly of the type more completely shown and described in U.S. Pat. No. 4,219,854 and including the pole tip configuration of the present invention. The thin film head assembly includes a pole piece layer 7 which connects to the lower pole piece layer 8 at 9 to form the magnetically permeable magnetic path from gap 11 that extends about the convolutions 12 of the coil which terminates in the leads 14 and 15. The pole piece layers 7, 8 are separated from one another and from the coil convolutions by insulating layers 18, 19, and 20. Insulating layer 18 also defines the transducing gap between pole pieces layers 7 and 8. Coil lead 15 connects with the coil convolutions at 22 and is separated from the convolutions by an insulating layer 23. This thin film head assembly is fabricated on and carried by a non-conductive substrate 25.

Figure 3:
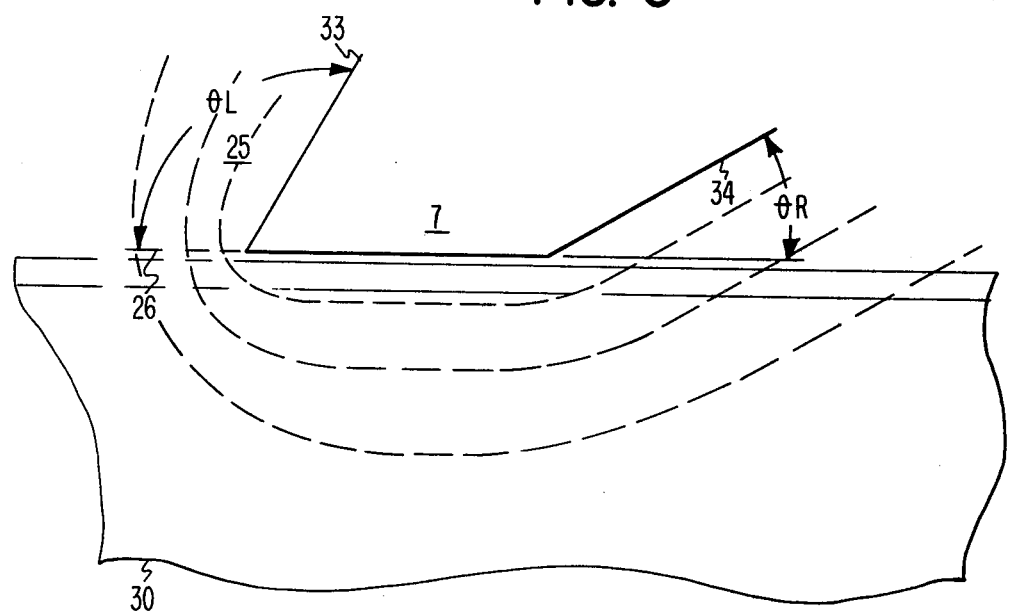
FIG. 3 is an enlarged view of the pole piece portion of FIG. 1 with the associated media in section and the fringe field pattern in dotted line view.

As seen in the enlarged view of FIG. 3 the head assembly carried by the substrate 25 "flies" above the media 30 on an air bearing in a generally parallel attitude. Accordingly, the orientation of the head assembly parts and in particular the pole layer 7 have with respect to the lower surface 26 of substrate 25, is the same orientation that is maintained with the upper, cooperating surface of the magnetic media 30. A first side 33 of the pole piece forms an obtuse angle $\theta L$ with the substrate surface 26. The second side 34 at the opposite transverse side of the transducing gap 11 forms an acute angle $\theta R$ with the substrate lower surface 26. Since the field at this side of the head is of no consequence, the angle can be as small as required for mechanical purposes and core efficiency. This may be as little as 30° or less.

In the fabrication of thin film transducer heads it is common practice to make the core element nearer the substrate (which would be core 8 of FIG. 2) wider than the core 7 which is further from the substrate and a later metalization layer. This results from process requirements rather than magnetic performance. Since minimization of the fringe field requires alignment of core sides 33 as well as the use of an obtuse angle, it is recommended that the sides 33 of cores 7 and 8 be laser trimmed to assure edge alignment.

Figure 4:
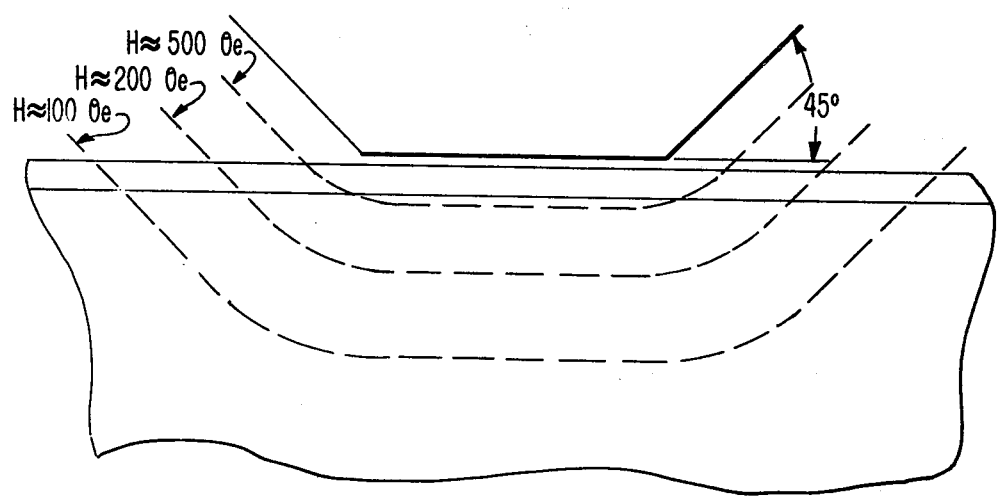
FIG. 4 shows a section of the pole pieces of a typical current design ferrite head with a dotted line showing of the surrounding fringe fields.

FIG. 4 shows a typical, current design ferrite head with 45° side walls on the read/write core. Within the 500 oersted field portion almost complete saturation of the media occurs. At a field level of 200 oersteds, existing magnetization of the media can be reduced about 20 percent and within the 100 oersted field about 5 to 10 percent reduction occurs. In the normal frequencies of interest, the head will "write" significantly wider than the physical core width, and this "write" erases previous data which it replaces with low resolution signals outside the physical core width. This represents an AC erase of old data in the region of 200 to 300 microinches laterally from the head. This 200 to 300 microinch dead band or band of no signal represents about a 15 percent to 20 percent reduction of signal for current magnetic disk designs, but is likely to become 30 percent to 50 percent degradation of signal in future magnetic disk drives where double track density or more will reduce the track pitch to half or less of the present track pitch. A partial erasure also occurs out to about 1000 microinches causing a non-uniform reduction of the signal across the track.

Referring again to FIG. 3, it will be observed that the 500 oersted, 200 oersted and 100 oersted field levels which project laterally from side of the pole piece, where the obtuse angle $\theta L$ occurs, are less than half the width when compared to the corresponding field levels in FIG. 4. At the opposite side of the pole piece where the acute angle $\theta R$ occurs there exists an extended fringe field region. By making angle $\theta R$ smaller, it is possible to make $\theta L$ larger causing compression of the field at the left side of the figure. The wide fringe field at the right side of FIG. 3 caused by the reduction of angle $\theta R$ is unimportant, since as each track is written from left to right, the data written in the wide fringe field during the writing of one track is overwritten by the head during the writing of the next successive track. The transition region between tracks is therefore determined solely by the narrow fringe field at the left side of the head as seen in FIG. 3.

FIGS. 5 and 6 are corresponding representations wherein FIG. 5 shows conditions related to a 45° ferrite head and FIG. 6 shows conditions related to the servo write head of the present invention having an obtuse angle at one pole side. In FIGS. 5A and 5B the ordinate value is magnetization density and the abscissa is radial displacement along the data surface. FIG. 5A shows the effect of writing the current track (last track magnetization) on the magnetization of the data written on the prior adjoining track (previously written track). The left side of the servo head is positioned as indicated by the vertical line D. The previously written track has one set of information recorded with a level of magnetization as indicated by curve A and the current track has a second set of information as indicated by the curve B. The horizontal dotted line C represents the magnetization level of curve A prior to writing the current track as represented by curve B. FIG. 5B shows a series of track interfaces written with alternating track types as shown by the A and B curves. FIG. 5C shows the position error signal (PES) as generated by some standard method for distinguishing tracks A and B as the ordinate and the track centerline position as the abscissa.

FIGS. 5A and 5B show the fringe field effect of curve B upon curve A wherein some erasure occurs over approximately 80% of the track pitch and generates a series of irregular curves having a reduced magnetization amplitude at the right side of each track magnetization curve. The zero value position error signal (FIG. 5C) is displaced about 20% of the track pitch since the integral sum of the area under the A curve must equal the integrated sum of the area under the B curve.

Figures 6A, 6B, 6C:
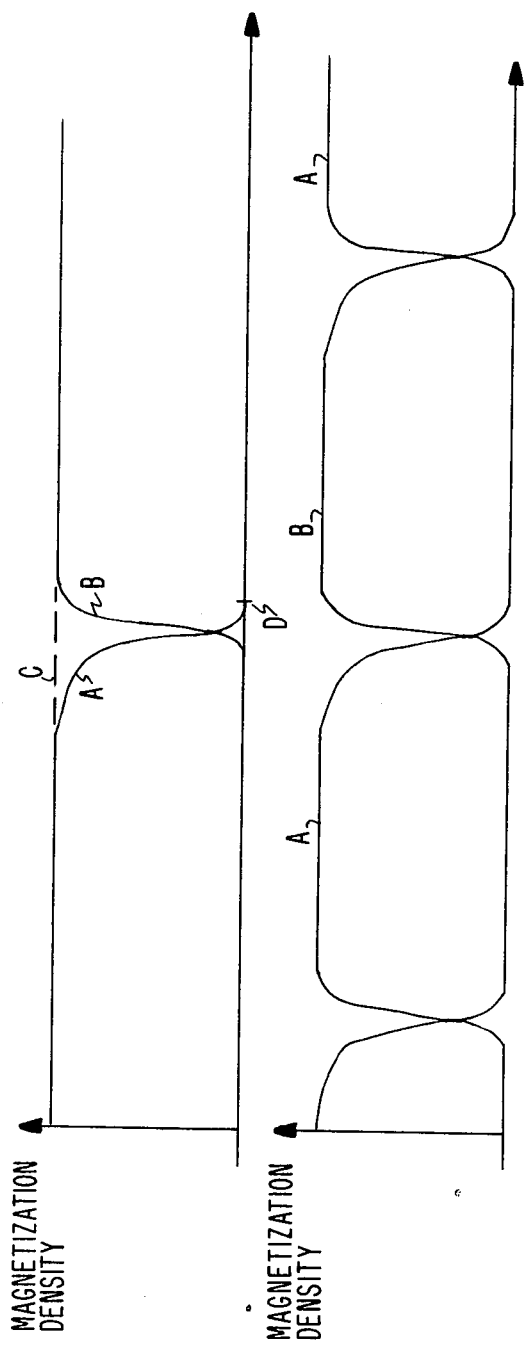
FIGS. 6A, 6B and 6C illustrates the same information as FIG. 5 with respect to the servo write head illustrated in FIGS. 1 through 3.

FIG. 6 shows the same information with respect to tracks written using the servo head design of the present invention which suppresses the fringe fields at the side of the servo head which is of interest. The existence of the reduced fringe field reduces the side erasure resulting in a smaller asymmetry in the magnetization curve. The position error signal zero position F experiences a significantly lesser displacement from the head interface. The zero PES is identified as the centerline of the associated data track. The most significant effect of the more symmetrical magnetization curves is the generation of greater linearity of the position error signal. The length of the linear portion of the position error signal curve of FIG. 6C is almost twice that of 5C. Ideally the position error signal of FIGS. 5C and 6C would be triangular to maximize the linearity.

Although heads are being designed with the pole piece side surface angles increasing to 80 to 90 degrees, the fringe field problem is only being diminished for existing track densities. A doubling of track densities will cause the degradation induced to exceed current levels. In devices using a dedicated servo surface with separate servo heads, use of the present servo writing technique would increase the linearity of the position error signal and signal magnitude through the elimination of a large portion of the dead band and the use of a wider head.

As shown in FIG. 1, the head design of this invention has been illustrated as a thin film head assembly since this would be the easiest technology in which to fabricate the transducer with the critical pole piece side at angle $\theta L$. It is also possible for this head design to be built of the conventional ferrite materials by sawing, grinding or other processing to obtain the angles. More difficulty can be anticipated with corner chipping and more extensive lapping may be required. The increased difficulty and lower yield should not be a significant factor since only a few transducer heads are required for servo writing purposes.

While the invention has been particularly shown and described with reference to a preferred embodiment, it will be understood by those skilled in the art that the foregoing and other changes in form and detail may be made therein without departing from the spirit and scope of the invention.

Having thus described my invention, what is claimed as new and desired to be secured by Letters Patent is:

1. A servo write head for writing magnetic servo information on an associated magnetic media having adjoining, parallel servo track portions,
    said write head including spaced pole pieces defining a transducing gap wherein the gap length is the length of the space between the pole pieces at the transducing gap and the gap width is the distance between first and second transverse sides of the confronting pole piece portions that substantially defines the width of the magnetized track as the associated media is moved past the transducing gap,
    said first transverse side surface of said write head pole pieces forming an obtuse angle with said associated media, and
    said second transverse side surface of said write head pole pieces forming an acute angle with said associated media,
    whereby the width of the fringing field adjacent said first transverse side surface is minimized.

2. The servo write head of claim 1 wherein the width of the pole piece from said first side to said second side at the transducing gap is greater than or equal to the centerline to centerline distance between adjoining tracks of the media being servo written.

3. The servo write head of claim 1 wherein said first transverse pole piece side surfaces form an angle with the associated media of at least 120 degrees.

4. The servo write head of claim 1 wherein said second transverse pole piece side surfaces of said head form an angle with the associated media not exceeding 30 degrees.

5. The servo write head of claim 1 wherein said head is a thin film magnetic head assembly formed on a non-magnetic substrate.

6. The servo write head of claim 5 wherein said first transverse pole piece side surfaces form an angle with the associated media of at least 120 degrees and said second transverse pole piece side surfaces form an angle with the associated media not exceeding 30 degrees.

* * * * *